United States Patent
Coughlan et al.

(10) Patent No.: US 7,840,464 B2
(45) Date of Patent: Nov. 23, 2010

(54) CREATING AND TRADING BUILDING BLOCK MORTALITY DERIVATIVES TO TRANSFER AND RECEIVE MORTALITY RISK IN A LIQUID MARKET

(75) Inventors: Guy D. Coughlan, New Malden (GB); David Epstein, London (GB); Alen Sen Kay Ong, London (GB); Robert J. Hall, Reigate (GB)

(73) Assignee: JPMorgan Chase Bank, N.A., New York, NY (US)

( * ) Notice: Subject to any disclaimer, the term of this patent is extended or adjusted under 35 U.S.C. 154(b) by 935 days.

(21) Appl. No.: 11/681,608

(22) Filed: Mar. 2, 2007

(65) Prior Publication Data

US 2008/0189222 A1    Aug. 7, 2008

Related U.S. Application Data

(60) Provisional application No. 60/888,120, filed on Feb. 5, 2007.

(51) Int. Cl.
*G06Q 40/00* (2006.01)
(52) U.S. Cl. ....................... 705/35; 705/36 R
(58) Field of Classification Search ............. 705/35, 705/36 R
See application file for complete search history.

(56) References Cited

U.S. PATENT DOCUMENTS

| | | | |
|---|---|---|---|
| 5,930,760 A | 7/1999 | Anderton et al. |
| 5,940,810 A | 8/1999 | Traub et al. |
| 5,970,479 A | 10/1999 | Shepherd |
| 6,021,397 A | 2/2000 | Jones et al. |
| 6,058,377 A | 5/2000 | Traub et al. |
| 6,061,662 A | 5/2000 | Makivic |
| 6,064,969 A | 5/2000 | Haskins |
| 6,173,276 B1 | 1/2001 | Kant et al. |
| 6,195,647 B1 | 2/2001 | Martyn et al. |
| 6,263,321 B1 | 7/2001 | Daughtery, III |
| 6,275,807 B1 | 8/2001 | Schirripa |
| 6,304,858 B1 | 10/2001 | Mosler et al. |
| 6,321,212 B1 | 11/2001 | Lange |

(Continued)

OTHER PUBLICATIONS

Kevin Dowd, David Blake, Andrew JG Cairns, Paul Dawson, "Survivor Swaps," Journal of Risk and Insurance, Mar. 2006, vol. 73, Issue 1, p. 1.*

(Continued)

*Primary Examiner*—Charles R Kyle
*Assistant Examiner*—David L Wood
(74) *Attorney, Agent, or Firm*—Goodwin Procter LLP

(57) ABSTRACT

The invention comprises A comprises a system and method for hedging or mitigating mortality exposure risk in a portfolio of mortality-dependent instruments. A mortality risk or longevity risk of the portfolio is calculated or otherwise determined. Then the sensitivity of the portfolio to mortality risk or longevity risk is calculated or otherwise determined, in other words, how much is cost or value of the portfolio affected by a change in mortality rate. To account for that mortality exposure, a selection is made of building block mortality derivatives that include age-based mortality derivatives. The selected plurality of selected plurality of building block mortality derivatives are used to create a hedge against the mortality risk or longevity risk of the portfolio.

34 Claims, 15 Drawing Sheets

U.S. PATENT DOCUMENTS

| | | |
|---|---|---|
| 6,360,210 B1 | 3/2002 | Wallman |
| 6,381,586 B1 | 4/2002 | Glasserman et al. |
| 6,418,417 B1 | 7/2002 | Corby et al. |
| 6,456,979 B1 | 9/2002 | Flagg |
| 6,615,180 B1 | 9/2003 | Anderton et al. |
| 6,636,834 B1 | 10/2003 | Schirripa |
| 6,684,189 B1 | 1/2004 | Ryan et al. |
| 6,835,176 B2 | 12/2004 | McNair |
| 6,947,904 B1 | 9/2005 | Macey |
| 7,016,870 B1 | 3/2006 | Jones et al. |
| 7,062,458 B2 | 6/2006 | Maggioncalda et al. |
| 7,120,600 B2 | 10/2006 | Tarbox et al. |
| 7,120,601 B2 | 10/2006 | Chen et al. |
| 2001/0032168 A1 | 10/2001 | Adamson et al. |
| 2001/0042034 A1 | 11/2001 | Elliott |
| 2001/0056398 A1 | 12/2001 | Scheirer |
| 2002/0002530 A1 | 1/2002 | May |
| 2002/0016762 A1 | 2/2002 | Feilbogen et al. |
| 2002/0026405 A1 | 2/2002 | Haar |
| 2002/0032644 A1 | 3/2002 | Corby et al. |
| 2002/0042767 A1 | 4/2002 | Kwan |
| 2002/0065755 A1 | 5/2002 | Shlafman et al. |
| 2002/0073007 A1 | 6/2002 | Ayache |
| 2002/0099646 A1 | 7/2002 | Agarwal et al. |
| 2002/0147671 A1 | 10/2002 | Sloan |
| 2002/0156658 A1 | 10/2002 | Selesny et al. |
| 2003/0065594 A1 | 4/2003 | Murphy |
| 2003/0078869 A1 | 4/2003 | Williams |
| 2003/0126069 A1 | 7/2003 | Cha |
| 2003/0187768 A1 | 10/2003 | Ryan et al. |
| 2003/0191672 A1 | 10/2003 | Kendall et al. |
| 2003/0208385 A1 | 11/2003 | Zander et al. |
| 2003/0220861 A1 | 11/2003 | Broms et al. |
| 2003/0233301 A1 | 12/2003 | Chen et al. |
| 2003/0236685 A1 | 12/2003 | Buckner et al. |
| 2004/0064391 A1 | 4/2004 | Lange |
| 2004/0103003 A1 | 5/2004 | Mayers et al. |
| 2004/0177021 A1 | 9/2004 | Carlson et al. |
| 2004/0177022 A1 | 9/2004 | Williams et al. |
| 2004/0220837 A1 | 11/2004 | Bonissone et al. |
| 2004/0220838 A1 | 11/2004 | Bonissone et al. |
| 2004/0220839 A1 | 11/2004 | Bonissone et al. |
| 2004/0243451 A1 | 12/2004 | Winklevoss et al. |
| 2004/0267647 A1* | 12/2004 | Brisbois ............ 705/35 |
| 2005/0027645 A1 | 2/2005 | Lui et al. |
| 2005/0060251 A1 | 3/2005 | Schwartz et al. |
| 2005/0071263 A1 | 3/2005 | Janssen |
| 2005/0086156 A1 | 4/2005 | Conroy et al. |
| 2005/0234791 A1 | 10/2005 | Krasnerman |
| 2005/0240514 A1 | 10/2005 | Gaubatz et al. |
| 2005/0267785 A1 | 12/2005 | Parankirinathan |
| 2006/0010060 A1 | 1/2006 | Jones et al. |
| 2006/0026092 A1 | 2/2006 | Klein et al. |
| 2006/0080199 A1 | 4/2006 | Tarbox et al. |
| 2006/0089860 A1 | 4/2006 | Fitzmorris |
| 2006/0111949 A1 | 5/2006 | Krasnerman |
| 2006/0122871 A1 | 6/2006 | Cowley et al. |
| 2006/0184442 A1 | 8/2006 | Krasnerman |
| 2006/0184449 A1 | 8/2006 | Eder |
| 2006/0206398 A1 | 9/2006 | Coughlin |
| 2006/0242052 A1 | 10/2006 | Long et al. |
| 2006/0253364 A1 | 11/2006 | Tarbox et al. |
| 2006/0282363 A1 | 12/2006 | Tarbox et al. |
| 2007/0033119 A1 | 2/2007 | Dubitsky et al. |
| 2007/0038481 A1 | 2/2007 | Darr |
| 2007/0219883 A1 | 9/2007 | Bronsnick et al. |
| 2008/0010095 A1 | 1/2008 | Joyce |
| 2008/0109346 A1 | 5/2008 | Valentino et al. |

OTHER PUBLICATIONS

Robert Hudson, "The Mortality Risk of Pensions—Methods of Contral and Policy Implications for the UK," Journal of Financial Regulation and Compliance, 2006, vol. 14, No. 4, pp. 363-374.*

"Hedge Fund", retrieved from the internet on Feb. 3, 2007, retrieved from the internet at http://en.wikipedia.org/wiki/Hedge_fund.

"Derivative (finance)", retrieved from the internet on Feb. 3, 2007, retrieved from the internet at http://en.wikipedia.org/wiki/Derivative_%28finance%29.

"Mortality Rate", retrieved from the internet on Feb. 3, 2007, retrieved from the internet at http://en.wikipedia.org/wiki/Mortality_rate.

M.A. Milevsky and David Promislow, "Mortality Derivatives and the Option to Annuitize", Aug. 2001, retrieved from the internet on Feb. 3, 2007, retrieved from the internet at http://papers.ssrn.com/sol3/papers.cfm?abstract_id=289551.

Andrew J. G. Cairns, et al., "Pricing Frameworks for Securitization of Mortality Risk", Jun. 22, 2004.

Kevin Dowd, et al., "Mortality-Dependent Financial Risk Measures", Insurance: Mathematics and Economics, vol. 38, p. 427-440, 2006.

Berhard Babel, et al., "Forecasting German mortality using panel data procedures", Department of Economic and Social Statistics, University of Cologne, Albertus-Magus-Platz 50923 Cologne, Germany, 2006.

Dr. Mary Hardy, "A Matter of Life and Death", Financail Engineering News, retrieved from the internet on Feb. 3, 2007, retrieved from the internet at http://www.fenews.com/fen46/topics_act_analysis/topics-act-analysis.htm.

D. Blake, et al., "Living with Mortality: Longevity Bonds and Other Mortality-Linked Securities", Institute of Actuaries and Faculty of Actuaries, Jan. 16, 2006.

Yijia Lin and Samuel H. Cox, "Securitization of Mortality Risks in Life Annuities", Apr. 6, 2004.

Alex Krutov, "Insurance Derivatives: A Hidden Market", Financial Engineering News, retrieved from the internet on Feb. 3, 2007, retrieved from the internet at http://www.fenews.com/fen51/one_time_articles/insurance-deriv/insurance-deriv.html.

Financial Times, "Capital Markets—Changing attitudes mean there is more life left in longevity bonds", published Nov. 22, 2006, retrieved from the internet on Feb. 3, 2007, retrieved from the internet at http://www.ft.com/cms/s/ebc56210-7a57-11db-8838-0000779e2340.html.

Finance Chat, "Protection", retrieved from the internet on Feb. 3, 2007, retrieved from the internet at http://fin-chat.com/aggy/tag/protection.

"Financial Derivatives, Third Edition", Robert. W. Kolb, James A. Overdahl (John Wiley & Sons 2003), Chapter 1, pp. 1-22.

International Search Report, issued in corresponding case PCT/US08/00598, dated Nov. 7, 2008.

International Search Report, issued in corresponding case PCT/US08/00599, dated Oct. 15, 2008.

U.S. Appl. No. 11/681,584, filed Mar. 2, 2007.

* cited by examiner

Research study mortality projection models

| Model | formula | |
|---|---|---|
| M1 | $\log m(t,x) = \beta_x^{(1)} + \beta_x^{(2)} \kappa_t^{(2)}$ | L-C |
| M2 | $\log m(t,x) = \beta_x^{(1)} + \beta_x^{(2)} \kappa_t^{(2)} + \beta^{(3)} \gamma_{t-x}^{(3)}$ | R-H |
| M3 | $\log m(t,x) = \beta_x^{(1)} + \kappa_t^{(2)} + \gamma_{t-x}^{(3)}$ | Currie |
| M4 | $\log m(t,x) = \sum_{i,j} \theta_{i,j} B_{i,j}^{ay}(x,t)$ | P-splines |
| M5 | $\text{logit } q(t,x) = \kappa_t^{(1)} + \kappa_t^{(2)}(x - \bar{x})$ | CBD |
| M6 | $\text{logit } q(t,x) = \kappa_t^{(1)} + \kappa_t^{(2)}(x - \bar{x}) + \gamma_{t-x}^{(3)}$ | CBD-x1 |
| M7 | $\text{logit } q(t,x) = \kappa_t^{(1)} + \kappa_t^{(2)}(x - \bar{x}) + k(x - \bar{x}) + \gamma_{t-x}^{(3)}$ | CBD-x2 |
| M8 | $\text{logit } q(t,x) = \kappa_t^{(1)} + \kappa_t^{(2)}(x - \bar{x}) + \gamma_{t-x}^{(3)}(x_c - x)$ | CBD-x3 |

Figure 5D

- If a *single* individual mortality rate (age X at time T) is shifted: Bump $q_{x,T}$ by an absolute amount $\delta_{x,T}$

- This results in an *instantaneous* change in the annuity value
  - The change in annuity value is proportional to a deferred annuity beginning at time T

- We define the mortality dollar duration, or "q-duration", $D_q$, to be the change in annuity value for an instantaneous fixed shift of size $\delta q$ in a single q $$\delta a_{x,t} = -D_q \delta q_{x,T}$$

$$D_q = \left(\frac{1}{1-q_{x,T}}\right)_{T-t|} a_{x,t}$$

- To calculate the q-duration for an underlying annuity (assuming that changes in each of the mortality rates are independent), simply sum the q-durations over the set of mortality rates on which the annuity depends

- q-duration allows risk to be bucketed

- This means that the effect on an annuity price of a change in a set of q's can be measured and hedged with a limited number of contracts

Figure 5F

For the Measurement Period, $t$, the Mortality Index Rate is calculated using the Minimum Data Requirements and the formula below Mortality Index Rate$_t$ = $q_t$, where $$q_t = a_m \sum b_x q_{m,x,t} + a_f \sum b_x q_{f,x,t}$$

$a_m$ and $a_f$ are Gender Weights, as outlined in the Demographic Breakdown $b_x$ are the Age Group Weights, as outlined in the Demographic Breakdown $q_{m,x,t}$ is the Mortality Rate for males in Age Group $x$ in Measurement Period $t$ $q_{f,x,t}$ is the Mortality Rate for females in Age Group $x$ in Measurement Period $t$

Figure 8

CREATING AND TRADING BUILDING BLOCK MORTALITY DERIVATIVES TO TRANSFER AND RECEIVE MORTALITY RISK IN A LIQUID MARKET

RELATED APPLICATIONS

This application asserts priority under 35 U.S.C. §119(e) to U.S. Provisional Patent Application No. 60/888,120, entitled "System and Method for a Risk Management Framework for Hedging Mortality Risk in Portfolios Having Mortality-Based Exposure," filed Feb. 5, 2007, Confirmation No. 8332, which is hereby incorporated by reference in its entirety.

This application is related by subject matter to the application Ser. No. 11/681,584 entitled "System and Method for a Risk Management Framework for Hedging Mortality Risk in Portfolios Having Mortality-Based Exposure," filed of even date herewith the present application, herein incorporated by reference in its entirety.

FIELD OF THE INVENTION

The present invention relates generally to processing associated with mortality-based derivatives, and more particularly, to a system and method for hedging the risk associated with portfolios having mortality risk profiles through the use of building block mortality derivatives that can be aggregated to effectively offset specific portfolio mortality risk exposure profiles.

BACKGROUND OF THE INVENTION

It is well known that certain types of financial instruments (or portfolios of instruments held by a issuer or sponsor) are mortality-based or mortality-sensitive, i.e., their payment or otherwise performance is correlated to the mortality performance of one or more persons in a population. For example, a typical life insurance contract is mortality-based because it pays a fixed amount to a beneficiary upon the death of the holder. A typical insurance annuity contract is mortality-based because it pays a yearly annuity from the payout start date (e.g., age 65) until the death of the holder. A defined-benefit pension plan is mortality-based because it pays a yearly retirement payment (which may be fixed or adjusted for inflation) from retirement until the death of the pension plan participant.

The above instruments, which may be held or issued by a company having a portfolio of many, are exemplary. There are variants of the mortality-based instruments above, e.g., an insurance annuity contract may give the holder the option of receiving the accumulated funds at a guaranteed interest rate instead of the market rate (so-called "guaranteed annuity option"). There may be entirely different types of mortality-based instruments.

Importantly, mortality-based instruments have mortality risk for the sponsor/issuer/company, sometimes referred to as the "mortality exposure" of a portfolio. Instruments like insurance annuities and pension plans have longevity risk, i.e., there is financial risk associated with the portfolio members living longer than expected or projected, thus receiving more payments over more years. Instruments like life insurance contracts have mortality risk, i.e., there is financial risk associated with the members dying earlier/faster than expected, thus resulting in payoffs occurring earlier than expected at a greater cost to the insurance company.

Both longevity risk and mortality risk are correlated to mortality rates. Longevity risk is associated with falling mortality rates, usually mortality rates falling more quickly than projected and, typically, as factored into the price of the instrument. Mortality risk is associated with either rising mortality rates, or at least, mortality rates failing to fall as quickly as projected and factored into price.

The risk to the portfolios of insurance companies, pension plans, and other holders or issuers of mortality-sensitive instruments, can be profound. For example, a defined-benefit pension plan may be fully-funded (assets projected to meet liabilities) in 2007 based on current mortality rate projections. However, if the actual mortality rates deviate from projections a slight amount (e.g., mortality rate decreases to produce a life expectancy 1 year greater than expected), the liabilities of the pension fund can increase significantly (e.g., liabilities could increase 5% or more). In a $5 billion defined benefit pension plan, that may translate to an unanticipated future $250 million shortfall. Thus, this longevity risk can rapidly turn a fully-funded pension plan into a seriously-underfunded pension plan, especially if the pension plan has other provisions (e.g., inflation adjustment) that provide a multiplier effect to the longevity risk.

A famous example of the potentially catastrophic results of failing to properly account for mortality exposure was the Equitable Life Assurance Society disaster in the late 1990's. That firm offered guaranteed annuity contracts based on 1950's mortality tables that did not reflect falling mortality rates. The longevity risk of those annuities contributed to the eventual downfall of Equitable Life, which closed to new business in 2000.

Traditionally, mortality-based instruments have sought to account for mortality risk by pricing using the mortality rate. The mortality rate is usually expressed as the rate of deaths per unit time in a population, typically the number of deaths per thousand individuals per year. The overall mortality rate of a population corresponds to the aggregation of a series of age-based mortality rates. Thus, the mortality rate is a function of age. For example, the mortality rate of 35 year olds tends to be lower than the mortality rate of 65 year olds. In the past, actuaries used actuarial tables to price various mortality-based instruments using measured mortality rates as a function of age.

At least through the $19^{th}$ century, the assumption in accounting for mortality risk by actuaries was that mortality rates were fixed over time, e.g., the mortality rate for a 35 year old in 1950 would be the same for a 35 year old in 1900. That, of course, was the mistake in the Equitable Life debacle, where 1950's mortality rates were applied to contracts issued decades later in a population with significantly-reduced mortality rates.

Over the last several decades, experts have recognized that the mortality rate function is not constant over time, rather, it changes over time. The mortality rate function in 1950 is different than that in 1970, which in turn is very different than that in 2000. In industrialized countries (and in most developing countries), the mortality rate at a given age x has dropped over the course of time, e.g., from 1970 to 2000.

As a result, experts have developed mortality rate models that project mortality rates, which can be expressed as the "force of mortality"·(t, x), where t is time in history (e.g., 2010) and x is the age of the person at which the mortality rate is provided. Some mortality rate functions are based on deterministic models, meaning there is an assumption that future mortality rates can be forecast with some accuracy. If mortality rates can be accurately forecasted, then the mortality risk of mortality-based portfolios can be almost fully accounted for (or otherwise internalized) when pricing the instruments or otherwise structuring those instruments. Additionally, this relative certainty allows portfolio holders like pension plans or insurance company annuity issuers to execute a proper Liability Driven Investment (LDI) strategy to invest assets with minimal risk (not more-than-necessary risk) to meet (not greatly exceed) anticipated liabilities.

However, more recent research asserts that mortality rate is not subject to a deterministic function that accurately predicts future rates. Instead, it is asserted that the force of mortality is a stochastic or random variable. Using actual mortality rate data, force of mortality might be modeled to an appropriate probabilistic function, but not a deterministic function. A probabilistic force of mortality function is useful in predicting the trend of mortality rate, even the expected value in the future, and some measure of variance (how tightly actual mortality data can be expected to cluster around the expected value). But it cannot be used to predict future mortality rates with deterministic certainty.

Various stochastic mortality rate models are discussed in the following articles, J. G. Cairns (Heriot-Watt University), David Blake (Cass Business School), and Kevin Dowd (Nottingham University Business School); "Pricing Frameworks for Securitization of Mortality Risk," (Jun. 22, 2004); Yijia Lin and Samuel H. Cox, "Securitization of Mortality Risks in Life Annuities" (Apr. 6, 2004); and Kevin Dowd, Andrew J. G. Cairns, and David Blake, "Mortality-Dependent Financial Risk Measures" (Discussion Paper PI-0609) (May 2006: π Pensions Institute).

Since the mortality rate apparently cannot be quantified deterministically, there is no ready mechanism to remove or greatly mitigate mortality risk in mortality-sensitive instruments (or portfolios of them) by adjusting the price or other structural aspects of the instruments. As a result, some have proposed various types of customized derivatives or other customized securities to hedge mortality risk. For example, some have proposed customized private longevity bonds that would hedge longevity risk.

An example of this was the unsuccessful European Investment Bank (EIB)/BNP longevity bond (LB). The EIB LB was a £540 million issue with a 25 year maturity structured as an annuity bond with annual floating coupon payments linked to the survivor index based on the mortality rate of English/Welsh males of age 65 in 2002. The coupon payments would be initially set at £50 million and would be reduced over time by the % of cohorts (cohorts are those in a group having the same birth year) age 65 in 2003 who died by the coupon date.

An example of a customized mortality hedge was the 2003 Swiss Re 3 year "life catastrophic bond" (sometimes referred to as the "Vita Capital I" mortality bond) designed to hedge Swiss Re's risk exposure to a catastrophic increase in short term mortality that might arise, for example, from a massive earthquake, plague, or tsunami. This $400 million principal issue would pay a mortality-independent coupon rate payment based on the 3 month U.S. LIBOR rate plus 136 basis points. The unprotected principal would be repaid based on mortality performance. If the mortality rate in 2007 was less than 1.3 times the rate in 2003, the principal would be paid in full. If the mortality rate in 2007 was greater than 1.3× the 2003 rate, the principal would be reduced 5% for each 0.01 increase in mortality rate until the principal would be exhausted at a mortality rate increase of 1.5. Similar products were developed by Swiss Re in 2005 ("Vita Capital II" morality bond) and Scottish Re in 2006 ("Tartan Capital" mortality bond).

Such customized derivatives to hedge for mortality risk suffer a number of significant drawbacks. Because they are customized to the hedging party, they entail expensive negotiation costs to deal with the custom, non-standard terms. As customized private derivatives, it may be difficult to find buyers to assume the mortality risk the hedger seeks to transfer.

Because they are customized and non-standard, these customized derivatives tend to be very illiquid, i.e., it is difficult to find secondary buyers and thus virtually impossible to establish a secondary market.

Because the payout of these customized derivatives may be based on a measurement population (e.g., all English/Welsh males aged 65) that does not match or correspond to the portfolio population, there may be "basis risk" that the hedge's reference population does not correspond to the portfolio's member population.

More broadly, there is no systematic technique for determining the mortality risk of individual portfolios, creating a comprehensive portfolio-specific hedge using standardized mortality derivative building blocks, and buying and selling those mortality derivative building blocks in both primary and secondary markets in a highly liquid fashion that permits the efficient transfer of mortality risk from hedging parties to investors.

Other problems and drawbacks also exist.

SUMMARY OF THE INVENTION

According to an embodiment of the invention, the invention comprises a system and method for hedging or mitigating mortality exposure risk in a portfolio of mortality-sensitive instruments. A mortality risk or longevity risk of the portfolio is calculated or otherwise determined. Then the sensitivity of the portfolio to mortality risk or longevity risk is calculated or otherwise determined, in other words, how much is the cost or value of the portfolio affected by a change in mortality rate. To account for that mortality exposure, a selection is made of building block mortality derivatives that include age-based mortality derivatives. The selected plurality of building block mortality derivatives are used to create a hedge against the mortality risk or longevity risk of the portfolio.

According to various aspects of the invention, the portfolio may be a group of life insurance products, annuity products, or a combination thereof. The portfolio may be a pension plan, such as a defined benefit pension plan.

According to another aspect of the invention, the building block derivatives are both age-based (e.g., age-segmented or age-stratified) as well as gender-based. Thus, each building block derivative may be a hedge against the mortality-related performance of an age segment/gender combination.

According to other aspects of the invention, the building block derivatives could be segmented or stratified according to other variables (along other axes), including but not limited to geography (e.g., continent, country, region), socioeconomic status (e.g., middle class, upper middle class, etc.); marital status (e.g., married, divorced, single); parental status (e.g., children/no children); lifestyle parameters (e.g., smoking/non-smoking, alcohol consumption, exercise), employment status (e.g., working, not working, retired, government, private sector, profession), disease history (e.g., cancer, heart disease, etc.), and others.

According to other aspects of the invention, the building block mortality derivatives may be structured in multiple forms, including mortality derivative bonds, mortality derivative options, mortality derivative swaps and forwards. Further, the building block mortality derivatives may include a first category structured to hedge against mortality risk and a second category structured to hedge against longevity risk.

According to another aspect of the invention, the mortality derivatives may be sold by an issuer to portfolio holders in a so-called primary market, and furthermore, the mortality derivatives may be bought and sold by hedgers and investors in a secondary market.

According to another embodiment of the invention, the invention comprises a system and method for establishing a plurality of building block mortality derivatives that can be used to hedge against or take views on mortality risk. In order to structure the building block mortality derivatives, first a plurality of age ranges (age segments) are established or selected. A mortality rate related index is established to be applied to the building block derivatives. The performance or behavior of such an index will govern the performance of the building block derivative, thus, a payout is established based on the performance of the mortality rate related index corresponding to the age range of a given building block derivative. Accordingly, a plurality of building block mortality derivatives are created that each hedge risk for an age range, and in some cases, an age range/gender combination.

According to another embodiment of the invention, the building block derivatives are segmented by cohort class and gender.

According to other aspects of the invention, the various age-segmented building block mortality derivatives that are available may cover specific, selected age segments that are considered key or otherwise important; may cover a contiguous range of the age spectrum, such as a 50 year span of life; or may cover an entire feasible life span from infancy to some maximum age.

According to other aspects of the invention, the price, payout or other structural aspects of the building block derivatives may be determined by a mortality rate model, which in some instances may be a stochastic (random-type) variable that is a function of gender, age and time and perhaps other variables). The invention is not limited to or dependent on any particular type of mortality rate model. The payout or otherwise the performance of the building block derivative may be based on an underlying mortality rate related index, which could be measured using general population type data.

According to other aspects of the invention, the building block mortality derivatives may include longevity risk mortality derivatives and mortality risk mortality derivatives, and may be structured as bond type mortality derivatives, option type mortality derivatives, swap type mortality derivatives, and forward type mortality derivatives, and the like.

The present invention, which in some instances may be referred to as the "LifeMetrics" product, has numerous benefits and advantages. The invention provides a systemized framework for determining the mortality exposure of a portfolio and creating an effective hedge against that mortality risk/longevity risk using standardized building block mortality derivatives.

The standardized building block mortality derivatives are beneficial because a hedger can pick and choose building blocks to create an aggregation that matches or otherwise corresponds to the mortality exposure of the portfolio.

Not only does this allow for the creation of a portfolio-specific mortality hedge, but it can be done without requiring a special customized derivative transaction that entails significant negotiation and other transaction costs.

The standardized character of the building block mortality derivatives means that they are relatively liquid, in fact, they are readily amenable to buying and selling on a secondary market.

The invention provides particular benefits to portfolio holders having significant mortality risk components, such as insurance companies and defined benefit pension plans, particularly in view that future mortality rates are not predictable with certainty, such that the invention allows those sorts of portfolio holders to hedge mortality risk in a manner otherwise not feasible.

Because the invention allows portfolio holders to more effectively hedge the mortality exposure of their portfolios, consumers such as life insurance holders, annuity holders, and pension beneficiaries may also benefit because the costs associated with price risk premiums are avoided or reduced and/or the risk of portfolio default is reduced.

Other benefits and advantages of the invention will be apparent to the person of ordinary skill in the art.

Accordingly, it is one object of the present invention to overcome one or more of the aforementioned and other limitations of existing systems and methods for hedging mortality risk or longevity risk in mortality-sensitive portfolios.

It is another object of the invention to provide a system and method for providing a plurality of building block mortality derivatives that can be used to hedge risk in mortality-dependent portfolios.

It is another object of the invention to provide a system and method for providing a plurality of building block mortality derivatives that are age-segmented and gender-segmented.

It is another object of the invention to provide a system and method for providing a plurality of building block mortality derivatives that can be used to hedge both mortality risks and longevity risks of varying risk profiles, sensitivities and magnitudes.

It is another object of the invention to provide a system and method for providing a plurality of building block mortality derivatives in different structures, such as bond type mortality derivatives, option type mortality derivatives, swap type mortality derivatives, forward type mortality derivatives, and so forth.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, including the figures, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 5D is a diagram illustrating some of the various mortality projection models (functions) that can be used in accordance with embodiments of the invention.

FIG. 5F is a diagram illustrating a method for determining the sensitivity of the value of an annuity to changes in mortality rates according to an embodiment of the invention.

FIG. 8 is an illustration of how a mortality index rate could be computed according to an embodiment of the invention.

DETAILED DESCRIPTION OF THE INVENTION

As a preliminary matter, the person of ordinary skill will recognize that most of the operations herein are susceptible to implementation using computers. Generally, the invention as a whole is implemented using computers, although discrete operations may in some instances not require a computer. A computer is understood to comprehend the variety of computing devices known to persons of ordinary skill in this field, including workstations, desktops, laptops, personal digital assistants, wireless computers, networked computers, general purpose computers, mainframe computers, so-called super computers, specialized computers, general purpose processors, and specialized processors.

Additionally, the invention may be implemented using the various networked communications infrastructures that are well known to the person of ordinary skill in the art. For example, a network such as the Internet, an intranet, a LAN, WAN, wireless network, wired network, or other private or public network, or combinations of the aforementioned, may be used to implement the invention. For some aspects of the invention, such as for the transfer of payments, the communications infrastructure may include networked systems such as the Electronic Funds Transfer (EFT) network, trade exchanges, and other communication channels known in the industry for implementing trading transactions (which may include settlement operations) such that those described herein.

Figure 1:
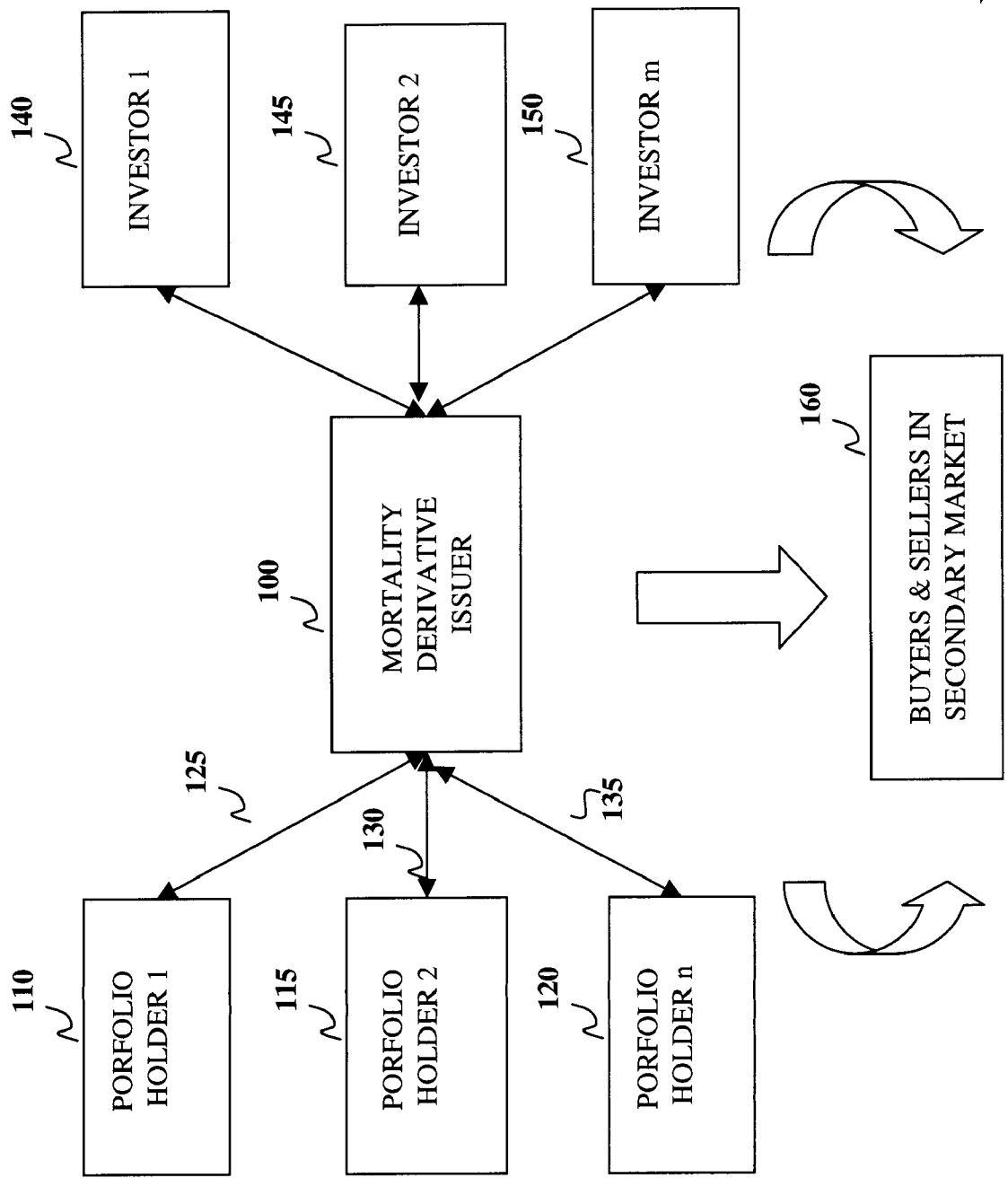
FIG. 1 is a block diagram of a system for hedging mortality risk in mortality-sensitive portfolios using building block mortality derivatives according to an embodiment of the invention.

FIG. 1 is a block diagram of a system for hedging mortality risk in mortality-sensitive portfolios using building block mortality derivatives according to an embodiment of the invention. The system of FIG. 1 includes mortality derivative issuer(s) 100; portfolio holders 110, 115, and 120; hedges 125, 130; and 135; investors 140, 145, and 150; and secondary market 160.

The operation of the system in FIG. 1 is generally as follows. Mortality derivative issuer 100 issues mortality derivatives to various portfolio holders 110-120 to effectively provide hedges 125-135 to mitigate the mortality exposure risk (i.e., mortality risk or longevity risk) of the portfolios. According to an embodiment of the invention, further discussed below, the hedges are provided as combinations of selected building block mortality derivatives. In exchange for the hedges, portfolio holders 110-120 may provide payment (immediate, deferred, and/or periodic) to mortality derivative issuer 100. Depending on the structure of the mortality derivatives, mortality derivative issuer 100 may provide a payout to the holder at the appropriate time and based on the associated mortality index performance.

Investors 140-150 are investors who invest directly in mortality derivative issuer 100 (e.g., supply working capital) and/or who repurchase building block mortality derivatives from mortality derivative issuer 100 in the primary market, and/or from portfolio holders 110-120 or other investors in the secondary market.

Any or all of the elements in FIG. 1 may carry out their functions using computers and networks as described above.

According to one aspect of the invention, the building block mortality derivates can be bought and sold on a secondary market 160. For example, secondary market 160 could be a mortality derivatives exchange established analogous to the Chicago Mercantile Exchange for equity derivatives and the Chicago Board of Trade for commodity futures.

Mortality derivative issuer 100 may be an investment bank or other financial institution able to issue the building block mortality derivatives. Portfolio holders 110-120 can be the holder of any type of mortality-dependent or mortality-sensitive portfolio, including but not limited to insurance companies holding life insurance products, insurance companies holding annuity products, pension plan sponsors (or trusts) holding defined benefit pension plans, and the like. Investors 140-150 may be any investor interested in investing in mortality derivative issuer 100 and/or mortality derivatives themselves. Investors may be individuals, legal entities like corporations, limited or general partnerships, limited liability companies, hedge funds, endowments and other institutional investors, and so forth. Secondary market 160 may be a market created and managed by mortality derivative issuer 100 or it may be operated by a separate entity that manages the mortality derivatives market.

Figure 2:
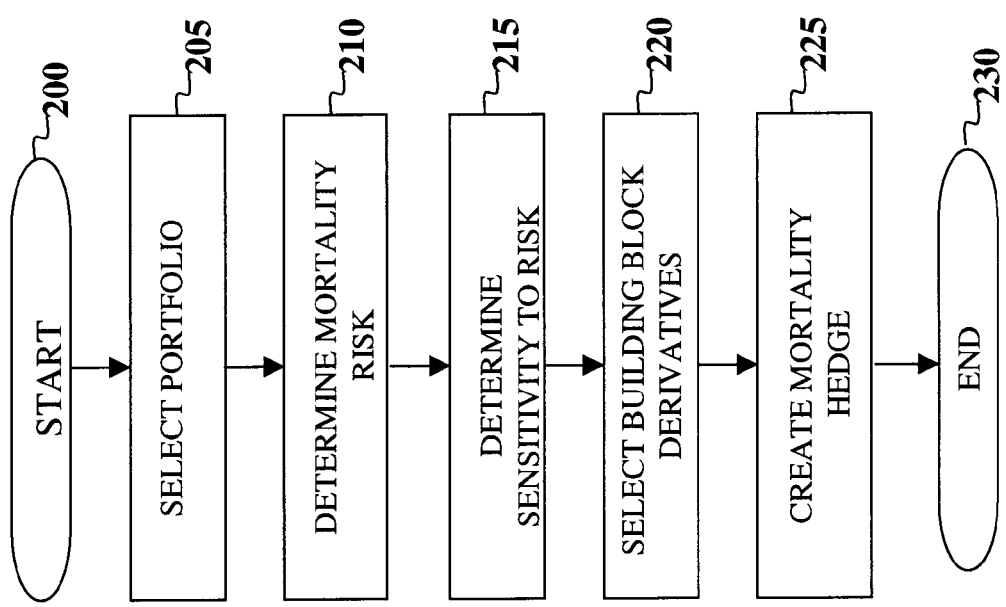
FIG. 2 is a block diagram of a method for evaluating and hedging mortality risk in a mortality-sensitive portfolio using building block mortality derivatives according to an embodiment of the invention.

FIG. 2 is a block diagram of a method for evaluating and hedging mortality risk in a mortality-sensitive portfolio using building block mortality derivatives according to an embodiment of the invention. After start at 200, a mortality-sensitive portfolio is selected for evaluation at 205. At 210, the mortality risk or longevity risk of the portfolio is determined. Mortality risk refers to the risk to the portfolio that mortality rates will rise or at least not drop as quickly as anticipated. Longevity risk is the risk that mortality rates will drop off faster than anticipated.

According to one embodiment, the mortality risk/longevity risk of the portfolio is evaluated as a function of the age of the basis population of the portfolio.

According to another embodiment of the invention, the mortality risk/longevity risk of the portfolio is evaluated as a function of selected ages (or age segments) in the basis population of the portfolio.

According to another aspect of the invention, the portfolio at issue is disaggregated or decomposed so that its risk profile is broken down into fundamental building blocks of mortality risk/longevity risk. Preferably, this is undertaken so as to decompose the portfolio's risk profile into a plurality of segments that correspond or match up to the segments of the issuer's available building block mortality/longevity derivatives.

At 215, the sensitivity of the portfolio to mortality risk (or longevity risk, as appropriate) is determined. According to one embodiment, the sensitivity is measured as the effect on the value (or obligations) of the portfolio as a function of various changes in mortality rate. According to yet another embodiment, that sensitivity in value (or change to value or obligations) is measured as a function of various changes in mortality rate at different ages or segments.

According to one embodiment, the measurement of portfolio sensitivity to risk may be expressed as a percentage of liabilities or in a monetary amount. The sensitivity measure could be expressed in terms of confidence intervals, such as a 95% worst case, 90% worst case, and so forth.

At 220, building block derivatives from a plurality of building block mortality derivatives are selected based on at least one of the determined mortality risk of the portfolio and the determined sensitivity to mortality risk of the portfolio. Preferably, the building block mortality derivatives comprise a plurality of pre-existing or pre-defined building block mortality derivatives. As such, such pre-existing or pre-defined building block mortality derivatives can be considered to comprise a "toolbox" of mortality derivatives available to assemble a hedge for nearly any mortality-sensitive portfolio that is decomposed as described above. Viewed another way, the collection of pre-existing or pre-defined building block mortality derivatives can itself be considered a "portfolio" of mortality derivatives that is made available by the issuer.

To the extent that the building block mortality derivatives are pre-existing or pre-defined, they are standardized and thus amenable to liquid trading on a secondary market. They are also more efficient and less expensive in that their terms are standard and thus party-specific transaction costs are avoided or at least mitigated.

According to one approach, the categories of building block derivatives (e.g., which age/gender buckets, as further described below) are chosen based on the determined mortality risk and the quantity (or magnitude) of each category as determined based on the risk sensitivity computation.

At 225, the selected building block mortality derivatives are issued, individually or in an aggregate fashion, to the portfolio holder so as to create a mortality hedge for the portfolio at issue.

Preferably, the method of FIG. 2 is implemented at least in part using one or more programmed computers. For example, it is well within the skill of the ordinary artisan to program a personal computer to determine the mortality risk of a portfolio, as well as its mortality sensitivity, based on portfolio parameter inputs and appropriate mortality rate projection models (discussed further below). In some instances, persons of skill in the art may use commercially available actuarial software to carry out at least some of these operations. As noted above, according to one embodiment of the invention, the mortality risk and mortality sensitivity of the portfolio are determined by decomposing the portfolio into segments corresponding to available building block mortality derivative segments.

Though not depicted in FIG. 2, the method may include a further step of evaluating the issued (or at least recommended) mortality derivative hedge against the mortality profile of the portfolio in order to identify or determine residual mortality risk. The residual mortality risk may or may not be reported to the hedging party. The residual mortality risk may be thresholded against some standard to determine whether the proposed mortality derivative hedge provides a sufficient hedge for the hedging party. If the residual is unacceptably high, the issuer may reevaluate or otherwise reconsider the portfolio at issue to assemble a different, better mortality hedge. According to another embodiment, the determined residual risk may be factored into the pricing by the issuer to the hedging party. For example, a greater residual risk may result a lower cost (or some discount) for the hedging party.

Figure 3:
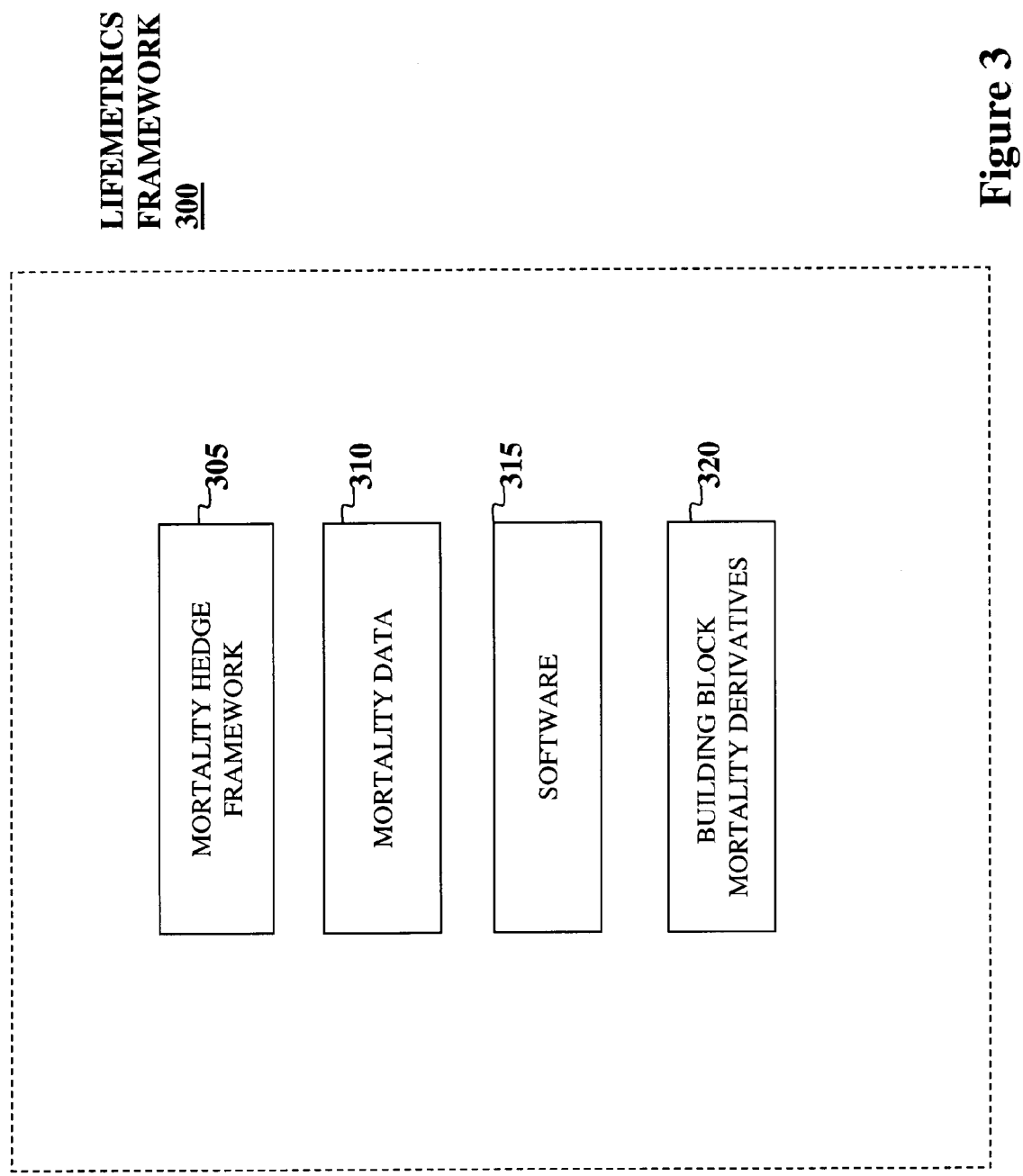
FIG. 3 is a block diagram of a comprehensive framework for hedging mortality risk using building block mortality derivatives according to an embodiment of the invention.

FIG. 3 is a block diagram of a comprehensive framework for hedging mortality risk using building block mortality derivatives according to an embodiment of the invention. According to the embodiment of FIG. 3, the "LifeMetrics" framework 300 is based on a mortality hedge framework 305; mortality data 310; software 315; and building block mortality derivatives 320.

The mortality hedge framework 305 includes one or more of: the mortality rate projection model(s) used to predict mortality rates; a mortality risk profile measurement module(s); a mortality sensitivity measurement module(s); a mortality hedge generation module (that outputs or recommends aggregate mortality derivative hedges from selected building block mortality derivatives based on mortality risk profile and/or mortality sensitivity inputs), and the mortality rate indices used to index actual mortality rate data that drives the performance of the building block mortality derivatives.

Mortality data 310 includes both past (historical) mortality rate data as well as future mortality rate data. Past mortality rate data is used to evaluate and, in some cases, fine tune, the mortality rate projection model(s). Future mortality rate data is applied to the mortality rate index that underlies particular building block mortality derivatives in order to determine their performance (e.g., payout).

Software 315 includes one or more software applications (or modules) for performing one or more of the operations described above for mortality hedge framework 305. Software 315 may include applications or modules for: implementing and evaluating mortality rate projection models; smoothing or fitting raw mortality data into estimates of current mortality; determining the performance of the mortality rate index based on actual mortality data; determining payout performance of building block mortality derivatives based on the mortality rate index behavior; and evaluating hedge effectiveness based on the performance of the hedges based on actual mortality data.

Building block mortality derivatives 320 are a series of building block mortality derivatives that can be selected from and aggregated in order to hedge mortality risk/longevity risk for a variety of different mortality-sensitive portfolios having varying structures and mortality risk profiles. According to one embodiment, building block mortality derivatives 320 are pre-existing or pre-defined in that their basic structure and terms are standardized.

According to one embodiment, building block mortality derivatives 320 are segmented or stratified by age ranges (e.g., 30-35, 36-40, 41-44; 30-35; 41-44; 49-53; or 30, 35, 40, 45, 55, 65; etc.). In this manner, the building block mortality derivatives 320 can be used to hedge for different "age buckets." In a further embodiment, building block mortality derivatives 320 are also segmented by gender (male, female). In this manner, the building block mortality derivatives 320 can be used to hedge for different age buckets/gender combinations. According to one aspect of the invention, the building block mortality derivatives 320 are used to hedge for different age bucket/gender combinations derived from the decomposition of the portfolio, as previously discussed.

According to an aspect of the invention, building block derivatives can be segmented or stratified in various other ways. For example, the building block derivatives could be segmented or stratified according to other variables (e.g., along other axes), including but not limited to geography (e.g., continent, country, region), socioeconomic status (e.g., middle class, upper middle class, etc.); marital status (e.g., married, divorced, single); parental status (e.g., children/no children); lifestyle parameters (e.g., smoking/non-smoking, alcohol consumption, exercise), employment status (e.g., working, not working, retired, government, private sector, profession), educational history (e.g., secondary school, college, post-graduate, etc.), disease history (e.g., cancer, heart disease, etc.), and others.

Preferably, the building block mortality derivatives 320 are public-reference-indexed in that their underlying mortality indices are based on public-type mortality data applied to some equation or formula. For example, government agencies may provide mortality data. Private companies may provide mortality data in the form of mortality indices, such as in the case of the "Credit Suisse Longevity Index"™ launched in 2005 that provides reference mortality index data for the U.S. Issuers of the building block mortality derivatives of the present invention may process publicly-available mortality data (or otherwise made available by government agencies) to generate their own actual mortality data inputs that determine mortality derivative performance.

According to one embodiment of the invention, the building block mortality derivatives are standardized insofar as their structure and/or terms are pre-existing or pre-defined. It should be understood that a standardized building block mortality derivative may have some terms or aspects that are customized.

According to one aspect of the invention, the building block mortality derivatives 320 have constant age segments (e.g., the age buckets may each span 5 years). According to other approaches, there may be derivatives having age buckets of different segment lengths (e.g., there may be an age bucket of 5 years for age 41-45 and one of 1 year for age 65). According to another aspect of the invention, the building block mortality derivatives 320 have age segments that are contiguous along the age curve, whereas in other aspects of the invention the age segments may be non-contiguous.

The building block mortality derivatives 320 may be structured according to a variety of derivative types. For example, they may be bond-type mortality derivatives with principal repayment and/or coupon payment that is mortality index dependent. They may be option type mortality derivatives providing for a payout when a mortality-related index exceeds, meets, or falls below a threshold (strike price). They may be structured as swaps or as other types of derivatives, such as a future, forward, warrant, and the like.

According to one embodiment of the invention, the building block mortality derivatives 320 include bond-type mortality derivatives, swap type mortality derivatives, and option type mortality derivatives.

According to another embodiment of the invention, the building block mortality derivatives 320 include a first category of longevity-type mortality derivatives designed to hedge against longevity risk and a second category of mortality-type derivatives designed to hedge against mortality risk.

Figure 4:
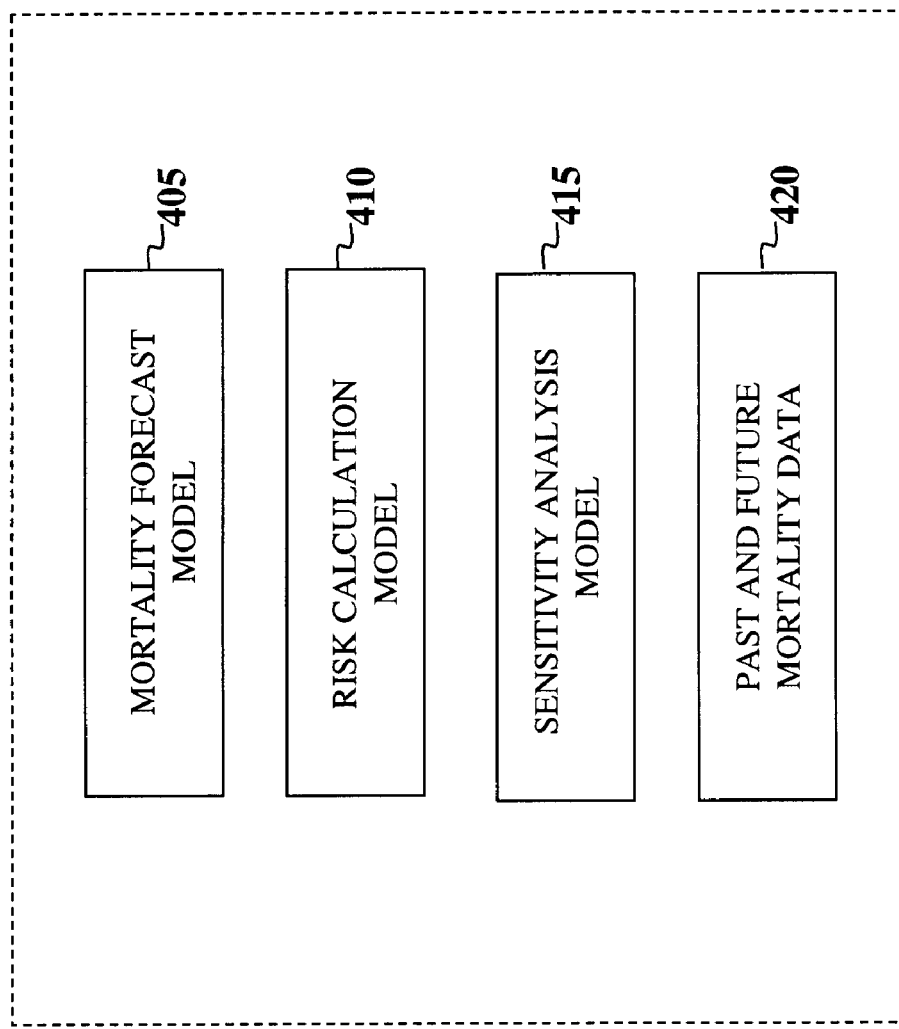
FIG. 4 is a block diagram illustrating the various models and/or analytics used to hedge risk using building block mortality derivatives according to an embodiment of the invention.

FIG. 4 is a block diagram illustrating the various models and/or analytics used to hedge risk using building block mortality derivatives according to an embodiment of the invention. The models/analytics may include mortality forecast model 405; risk calculation model 410; sensitivity analysis model 415; and pass/future mortality data 420. The models 405-415 are preferably implemented using software executed on a computer. As discussed in FIG. 3, there may be a mortality hedge generation module that computes an appropriate hedge based on risk profile/sensitivity analysis. The risk profile/sensitivity analysis may comprise decomposing the portfolio at issue into constituent segments that correlate or correspond to building block mortality derivatives available from the issuer's mortality derivative toolbox.

Just by way of example, for a particular defined benefit pension plan the mortality hedge generation module might recommend a $100M, 10 year longevity hedge for the 60-65 age segment and a $250M, 20 year longevity hedge at age 50-55. If the issuer's building block mortality portfolio (e.g., the issuer's toolbox) includes bond-type mortality hedges for a 60-65 age segment having a 10 year maturity and a standard $10 million principal "denomination", the issuer might recommend the issue of 10 units (providing a $100M hedge) to the hedger.

On the other hand, the issuer's building block mortality portfolio may specify the derivative type (bond), age segment (60-65), duration (10 years), but not the principal. In that case, the principal amount will be negotiated/established between the issuer and the hedger for the mortality derivative that is otherwise standardized.

Continuing with the illustrative scenario, the $250M, 20 year longevity hedge at age 50-55 might be implemented using six (6) separate q-segment derivatives, and each having a 1 year age span (i.e., age 50, 51, 52, 53, 54, 55), having a bond-derivative structure, a 20 year maturity, and appropriate principals.

Figure 5A:
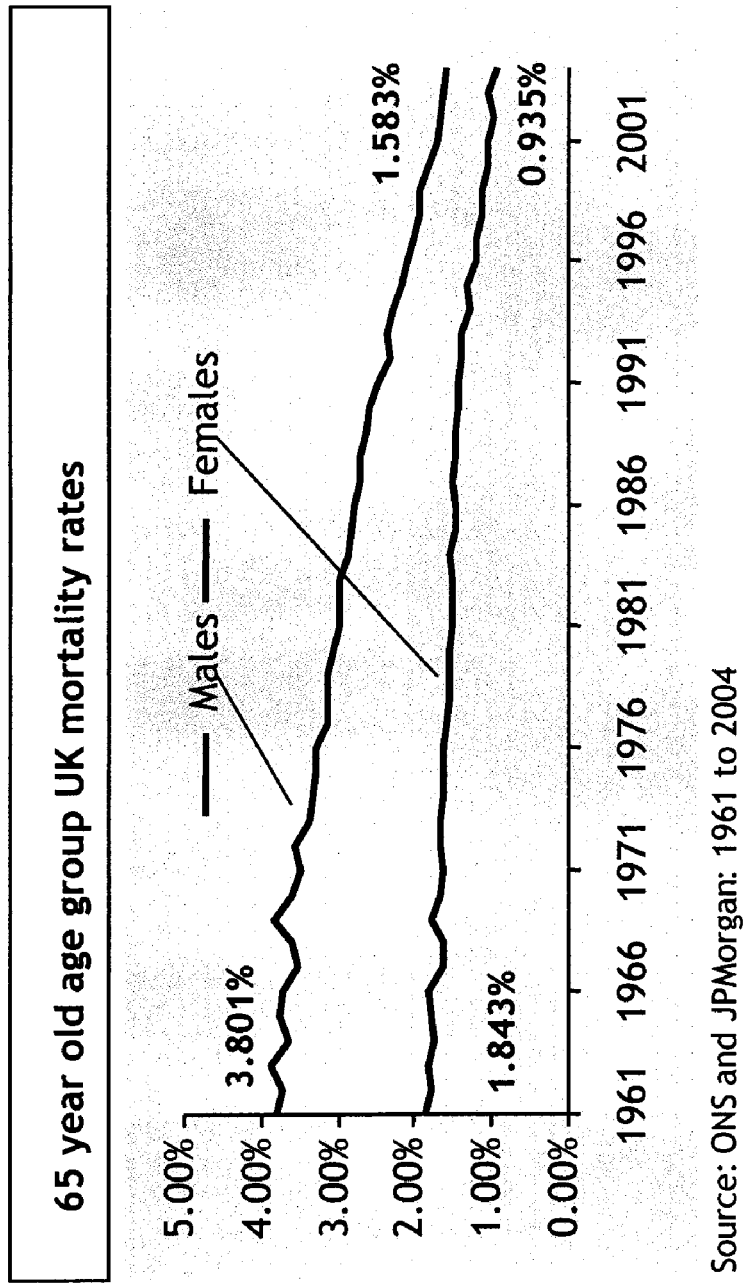
FIG. 5A is a graph illustrating mortality rate data for 65 year old males in the United Kingdom over a forty year period.
Figure 5B:
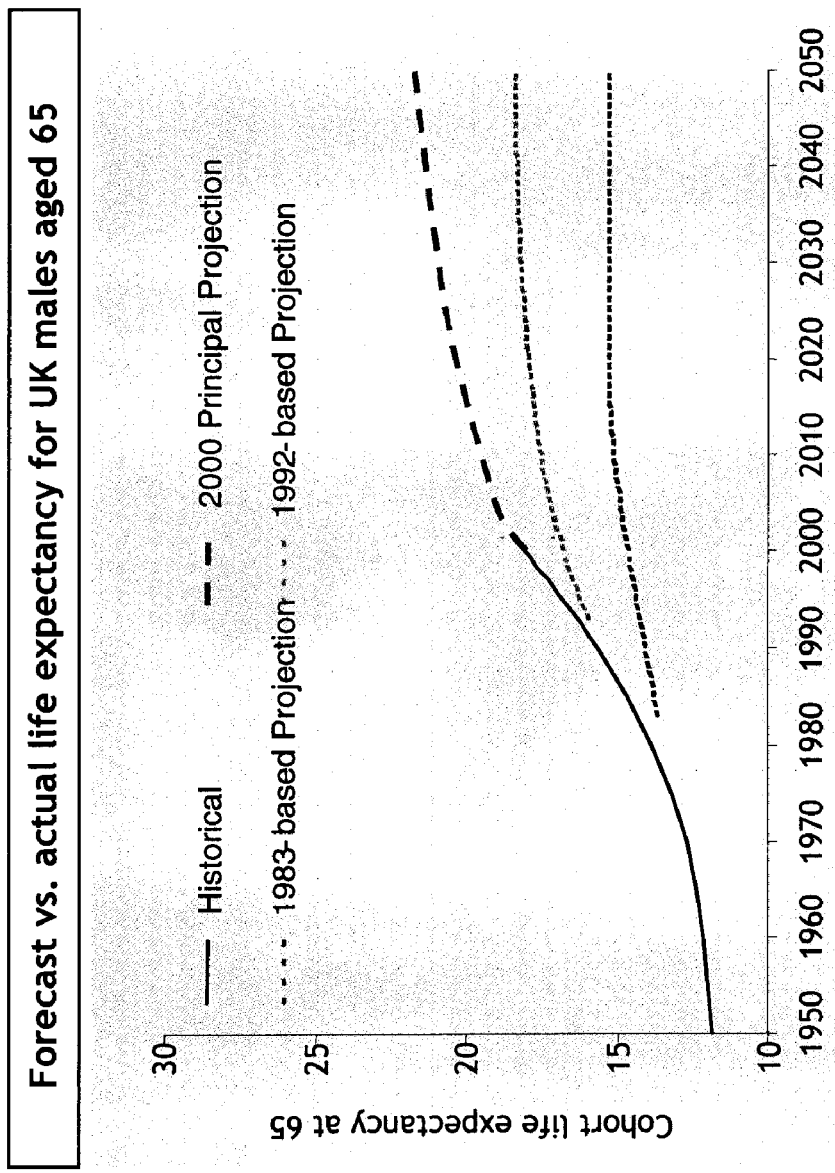
FIG. 5B is a graph illustrating forecasted versus actual life expectancy data for 65 year old males in the United Kingdom over a one hundred year period.
Figure 5C:
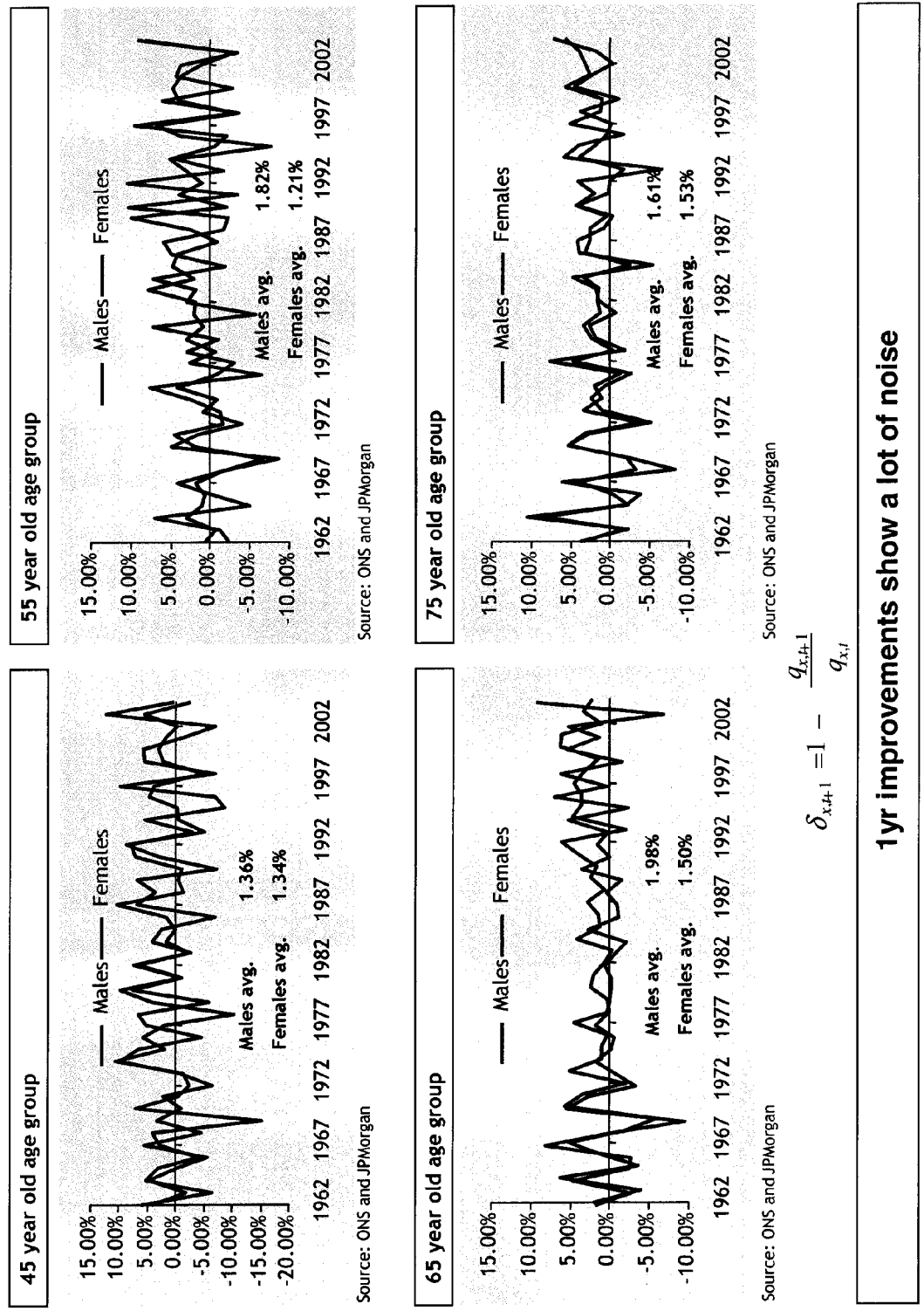
FIG. 5C is a graph illustrating annual changes in mortality rate data for various population subgroups in the United Kingdom over a forty year period.

FIGS. 5A-5C provide some examples of mortality trends and model performance based on U.K. data. Generally, it is believed that U.S. data (and data from other developed countries) follows what has been observed in the U.K.

FIG. 5A is a graph illustrating mortality rate data for 65 year old males in the United Kingdom over a forty year period. FIG. 5A illustrates the great risk that can be posed by changing mortality rates to mortality-sensitive portfolios. From 1961 to 2001, the mortality rate for 65 year old U.K. males fell from 3.801% to 1.583%, which corresponds to a 58% drop in mortality rate. FIG. 5A is based on mortality data provided by the U.K.'s Office of National Statistics (ONS).

FIG. 5B is a graph illustrating forecasted versus actual life expectancy data for 65 year old males in the U.K. over a one hundred year period. This figure illustrates the significant problems that can be created by inaccurate mortality rate projections. As shown in FIG. 5B, a 1983-based projection for the life expectancy of a 65 year old in 2000 turns out to be about 5 years less than the actual life expectancy. Even the 1992-based projection evidences an underestimation of life expectancy by several years as of 2000. (Note: the 1983 and 1992 projections were U.K. government forecasts.)

As previously discussed, these inaccurate projections of mortality rates (which translate into greater-than-expected life expectancies) can be catastrophic for mortality-sensitive portfolios, such as defined benefit pension plans.

FIG. 5C is a graph illustrating annual changes in mortality rates for various population subgroups in the United Kingdom over a forty year period. As reflected in each of the graphs for males/females of age 45, 55, 65, and 75, the data shows a trend of mortality improvement over the four decades, although on a year-to-year basis there is significant variance or "noise", evidencing the stochastic nature of the mortality rate variable.

The graphs of FIG. 5C show improvements in mortality rate. The yearly improvement in mortality rate is expressed by:

$$\delta_{x,t+1} = 1 - \frac{q_{x,t+1}}{q_{x,t}}$$

where q is the mortality function corresponding to the likelihood of death in the next year after time t, and x is the age of the subject.

FIG. 5D is a diagram illustrating the various mortality projection models (functions) that can be used in accordance with embodiments of the invention. The person of ordinary skill in the art will be familiar with various mortality projection models such as those shown in FIG. 5D. The literature on mortality projection contains a number of published articles describing different mortality projection models and their performances. As previously indicated, the present invention does not require the use of any particular mortality projection model.

Figure 5E:
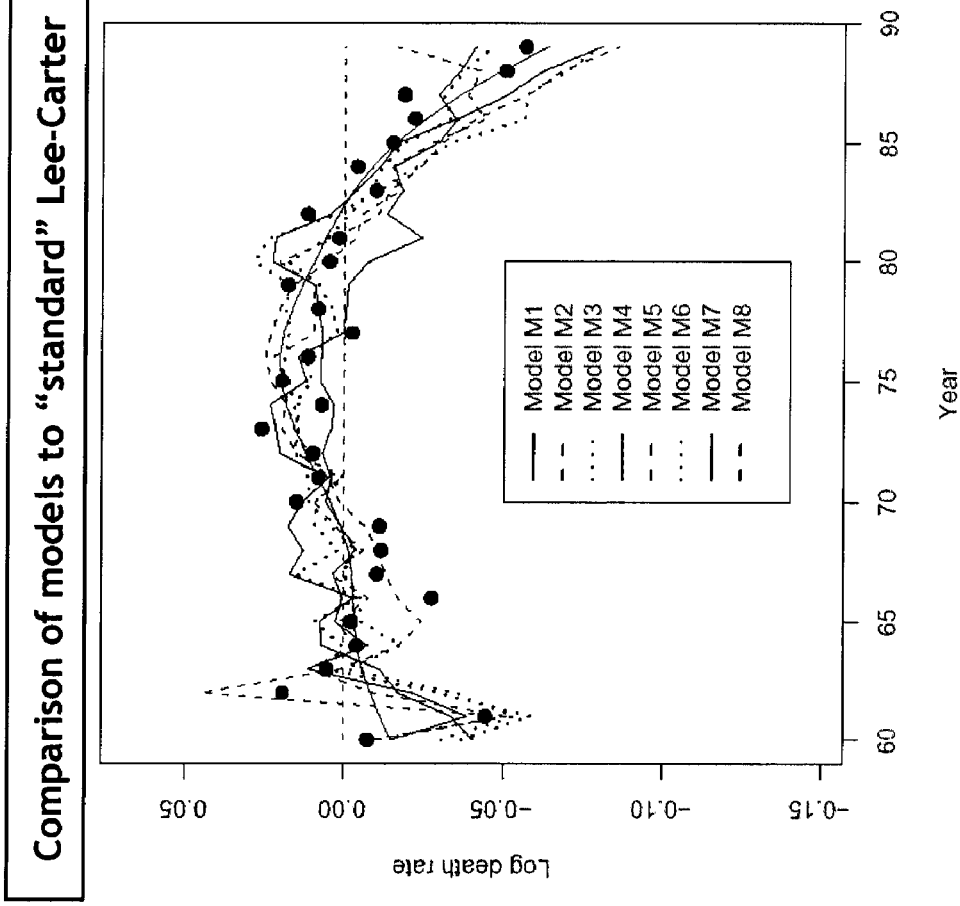
FIG. 5E is a diagram illustrating the performance of various mortality projection models.

FIG. 5E is a diagram illustrating the performance of various mortality projection models over a 30 year period using the standard Lee-Carter model as a basis for comparison.

FIG. 5F is a diagram illustrating a method for determining the sensitivity of the value of an annuity to changes in mortality rates. This diagram illustrates a methodology for assessing the sensitivity of a given annuity to a change in mortality rate at age X at a time T in the future. The mortality rate $q_{X,T}$ is adjusted downwards by a delta amount $\delta_{X,T}$, which corresponds to a change in annuity value $D_q$ as defined by the equation in FIG. 5F.

As shown in FIG. 5F, the overall sensitivity of the annuity to longevity risk can be determined by summing the q-durations across the set of mortality rates on which the annuity depends (e.g., the annuity basis population).

As reflected in FIG. 5F, the q-duration concept is one mechanism to allow risk to be bucketed according to different age segment/gender combinations. Where q is a function of other variables as previously discussed (socioeconomic status, geographic location, educational status, etc.), the q-duration concept allows risk to be bucketed according to these other variables.

Once the mortality risk profile and sensitivity to changes in q is determined for a given portfolio (e.g., this process may correspond to the decomposition process previously described), it can be hedged using a finite set of mortality derivatives corresponding to those q's.

FIG. 5F illustrates the q-duration ($D_q$, change in annuity value) determination for an annuity type portfolio. The person of ordinary skill in the art will recognize that the sensitivity to mortality risk of a different product like life insurance can be computed in similar fashion as FIG. 5F. Of course, the focus in the case of a product like life insurance will be rising mortality rates or, at least, mortality rates failing to drop as quickly as anticipated.

Figure 6A:
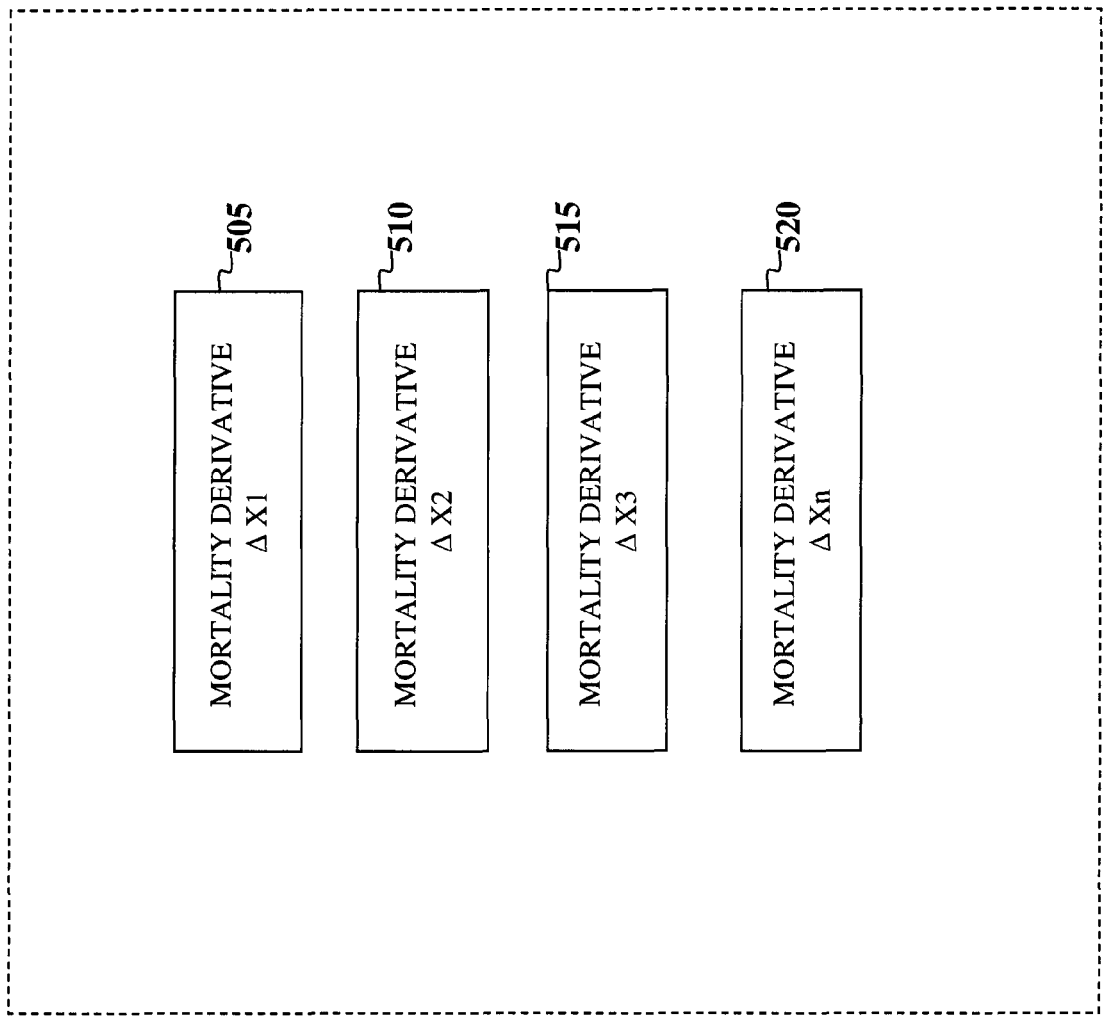
FIG. 6A is a block diagram illustrating a plurality of building block derivatives according an embodiment of the invention.

FIG. 6A is a block diagram illustrating a plurality of building block mortality derivatives 320 according an embodiment of the invention. As described previously in connection with FIG. 3, the plurality of building bucket mortality derivatives 505, 510, 515, and 520 each correspond to an age range or an age (year) Δ Xn which may be of constant or varying length. Additionally, these mortality derivatives are not only stratified or segmented by age, but they are preferably stratified by gender as well.

As the mortality rate q function can be developed to be a function of a number of variables besides age and gender, a plurality of building block derivatives can be created according to q-segments for multiple variables. In other words, the buckets can correspond to the q function being mapped to segments along multiple axes.

Figure 6B:
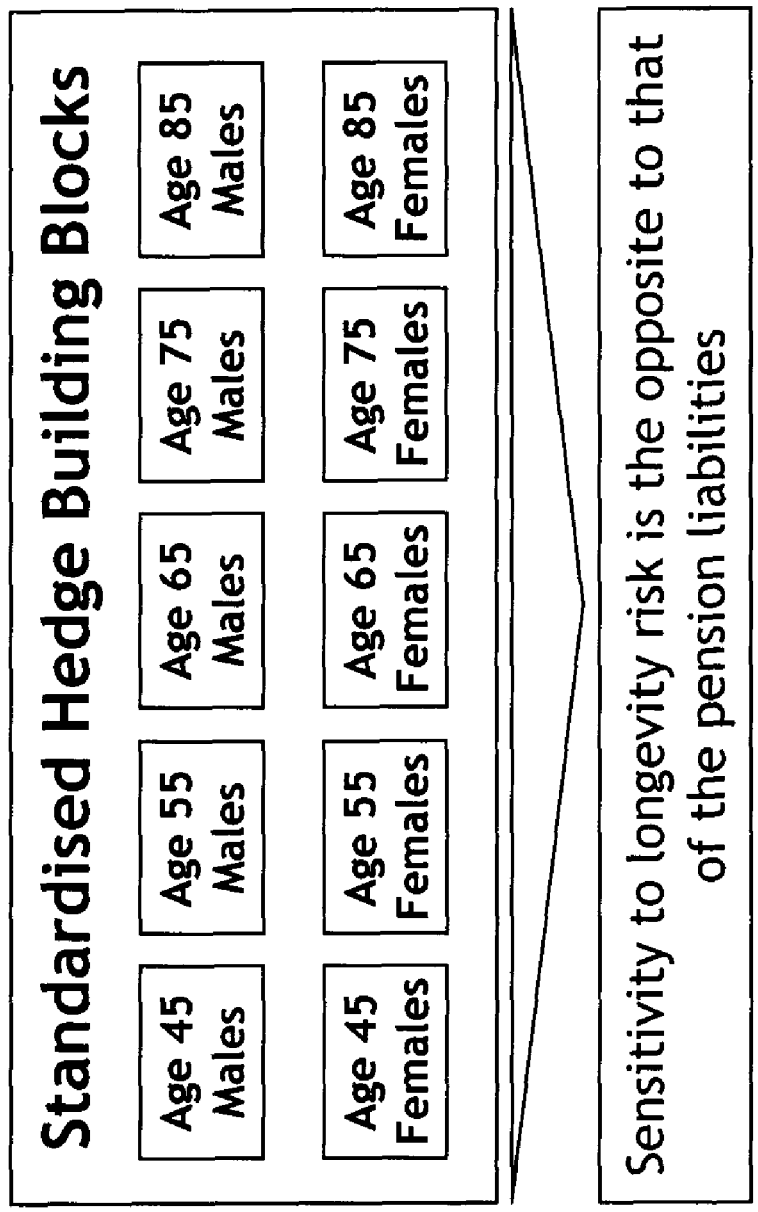
FIG. 6B is a block diagram illustrating a plurality of building block derivatives according another embodiment of the invention.

FIG. 6B is a block diagram illustrating a plurality of building block derivatives according another embodiment of the invention. As shown in FIG. 6B, the mortality derivative building blocks are established for exemplary ages 45, 55, 65, 75, and 85, for each of males and females. As noted in FIG. 6B, the building block derivatives may be structured have a sensitivity to longevity risk that is the opposite, or generally the inverse, of that in a pension fund or other longevity risk type portfolio. In this manner, the size/quantity and types of building block derivatives can be selected to appropriately offset (hedge) the longevity risk in the portfolio at issue. FIG. 6B is merely an illustration of an exemplary set of building block mortality derivatives. A different set of q-segment buckets (age/gender combinations) could be used. According to one embodiment, the available building blocks may be structured to have highly granular q-segments, e.g., in 1-year age segments.

While much of the discussion of the buckets focuses on age segments, it should be appreciated that the building blocks can just as easily be segmented based on cohort (birth year) classes.

More generally, the issuer's toolbox of building block mortality derivatives could have a series of available maturities, such as 1 year, 3 year, 5 year, 10 year, 20 year, 30 year, and a run-off term. The toolbox could have a plurality of different types of mortality derivatives, including mortality bonds, options, swaps, forwards, and the like. In the case of bond-type mortality derivatives, there could be standardized coupon rates and principal repayment terms. In the case of other types of mortality derivatives, terms such as "strike prices" could be standardized. Finally, the principals/notional principals of the various mortality derivatives could be standardized.

Additionally, the q-segments can be standardized. Just by way of example, there may be age/gender q-segmented mortality derivatives for each year between 25 and 85 for both males and females (e.g., 25/M, 26/M, 27/M . . . 85/M). Instead, or in addition, there may be q-segmented mortality derivatives for age ranges of 25-29/M, 30-34/M, 35-39/M, . . . , and so forth. The person of ordinary skill in the art will recognize that standardization of the q-segments along other axes (e.g., socioeconomic status, geography, etc.) besides age and gender is easily understood and well within the spirit and scope of the present invention.

Figure 7:
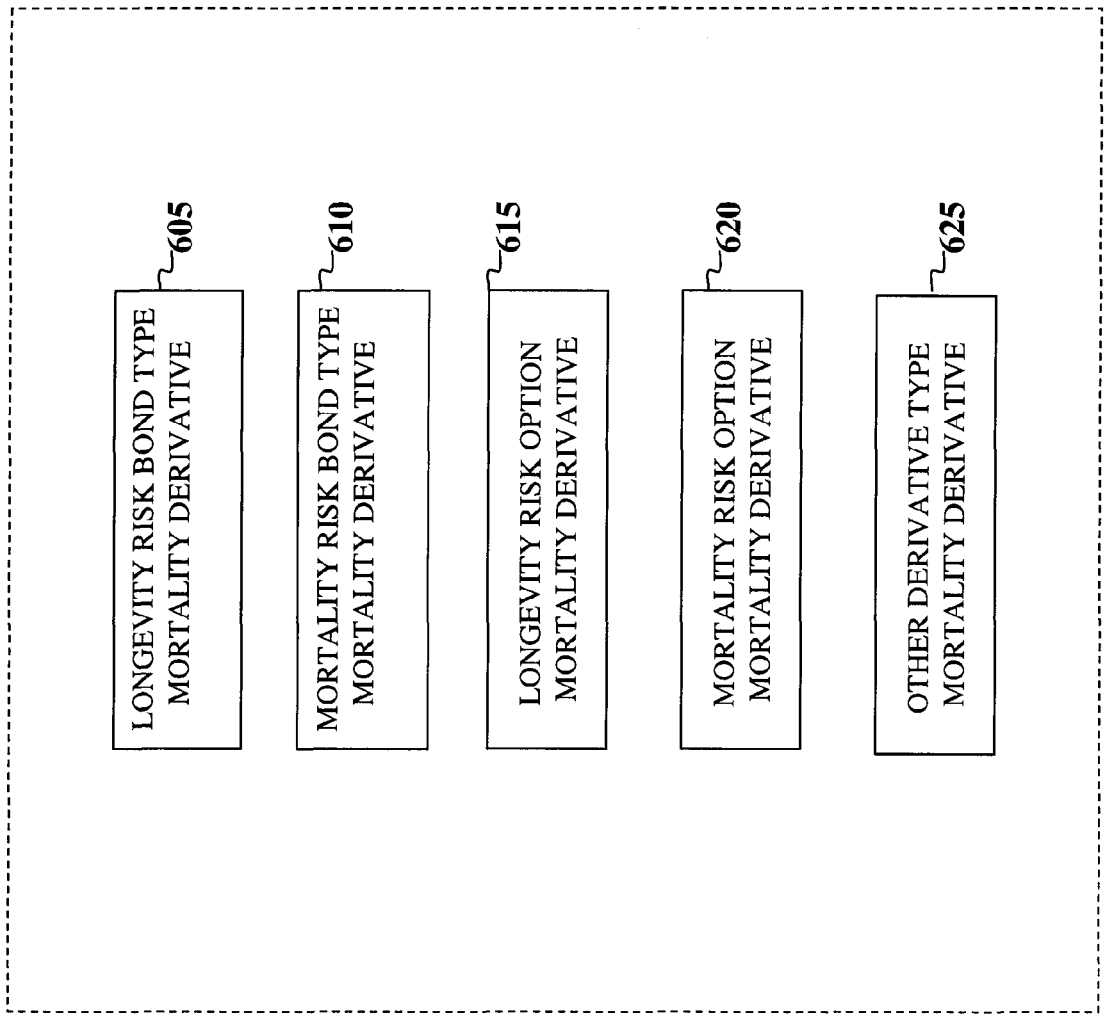
FIG. 7 is a block diagram illustrating the various structures of mortality based derivatives that can be employed in accordance with an embodiment of the invention.

FIG. 7 is a block diagram illustrating the various structures of mortality based derivatives that can be employed in accordance with an embodiment of the invention, including longevity risk bond type mortality derivatives 605; mortality risk bond type mortality derivatives 610, longevity risk option mortality derivatives 615, mortality risk option mortality derivatives 620, and other derivative type mortality derivatives 625. Though not specifically shown in FIG. 7, the building block mortality derivatives may include those structured as forwards or swaps.

In a mortality derivative swap, there may be an obligation in the future to exchange (value bases on) a fixed mortality rate at the maturity date for the observed morality rate at that date. For example, it may be structured as a zero coupon swap with no obligation of interim payments. According to one embodiment of a morality swap derivative, the hedger exchanges payments for a fixed mortality for payments for a floating mortality.

In one embodiment of a zero-coupon type mortality swap structure, at maturity a pension plan pays a floating mortality rate of (notional*actual mortality rate) based on actual mortality experience for each cohort class, and receives from the issuer a fixed mortality rate of (notional*strike rate) for a strike rate benchmark for each cohort class.

One example of a mortality swap would have the following structure: notional amount of $15 million U.S.; tick of $1 U.S. per basis point mortality rate; strike rate of 1% per annum; reference rate of 65 year old male mortality rate on maturity date as calculated by calculation agent based on national population data; and a maturity date (term) of 10 years from issue. Depending on the strike rate, there may or may not be a premium (up-front) payment made by the hedger. At settlement (maturity), if the reference rate is <strike rate then the hedger receives a payment of the (notional*[strike rate−reference rate]*tick size). If the reference rate is >strike rate then the hedger pays a payment of the (notional*[reference rate−strike rate]*tick size).

One example of a mortality derivative option would have the following structure: notional amount of $15 million U.S.; tick of $1 U.S. per basis point mortality rate; strike rate of 1% per annum; reference rate of 65 year old male mortality rate on maturity date as calculated by calculation agent based on national population data; and a maturity date (term) of 10 years from issue. There may be a premium (up-front) payment made by the hedger. At settlement (maturity), the hedger may receive a payment of the (notional*max[strike rate−reference rate, 0]*tick size).

It should be appreciated that the above are provided just to illustrate several examples of a building block derivative for a specific age-gender bucket (65/male) and using specific derivative structures (swap, option). It should be readily understood that the building blocks can be extrapolated for various age/cohort segments and gender combinations, and using other types of derivatives.

It should also be understood that the maturity of the mortality derivatives can be set as appropriate. Some building block derivatives may have terms of 10 or 20 years, whereas others could be 5 years or less, including down to a 1 year term. The term can also be based on a run-off of the underlying population, meaning that the term continues until the last to die from the reference population.

FIG. 8 is an illustration of how a mortality index rate could be computed according to an embodiment of the invention. According to FIG. 8, the Mortality Index Rate$_t$=q$_t$, according to the equation:

$$q_t = a_m \Sigma b_x q_{m,x,t} + a_f \Sigma b_x q_{f,x,t}$$

where a$_m$ and a$_f$ are gender weights, as per a specified demographic breakdown; b$_x$ is the age group weights, as per the demographic breakdown; and where q$_{m,x,t}$ is the mortality rate for males in age group x in measurement period t; and q$_{f,x,t}$ is the mortality rate for females in age group x in measurement period t.

The person of ordinary skill in the art will recognize that, according to the embodiment of the invention based on age/gender combinations, the derivative building blocks correspond to specific q$_{m,x,t}$ or q$_{f,x,t}$ buckets. The person of ordinary skill in this art will also readily recognize that the mortality index rate to be used for the mortality derivatives of the invention could easily be given according to a different formula.

Figure 9:
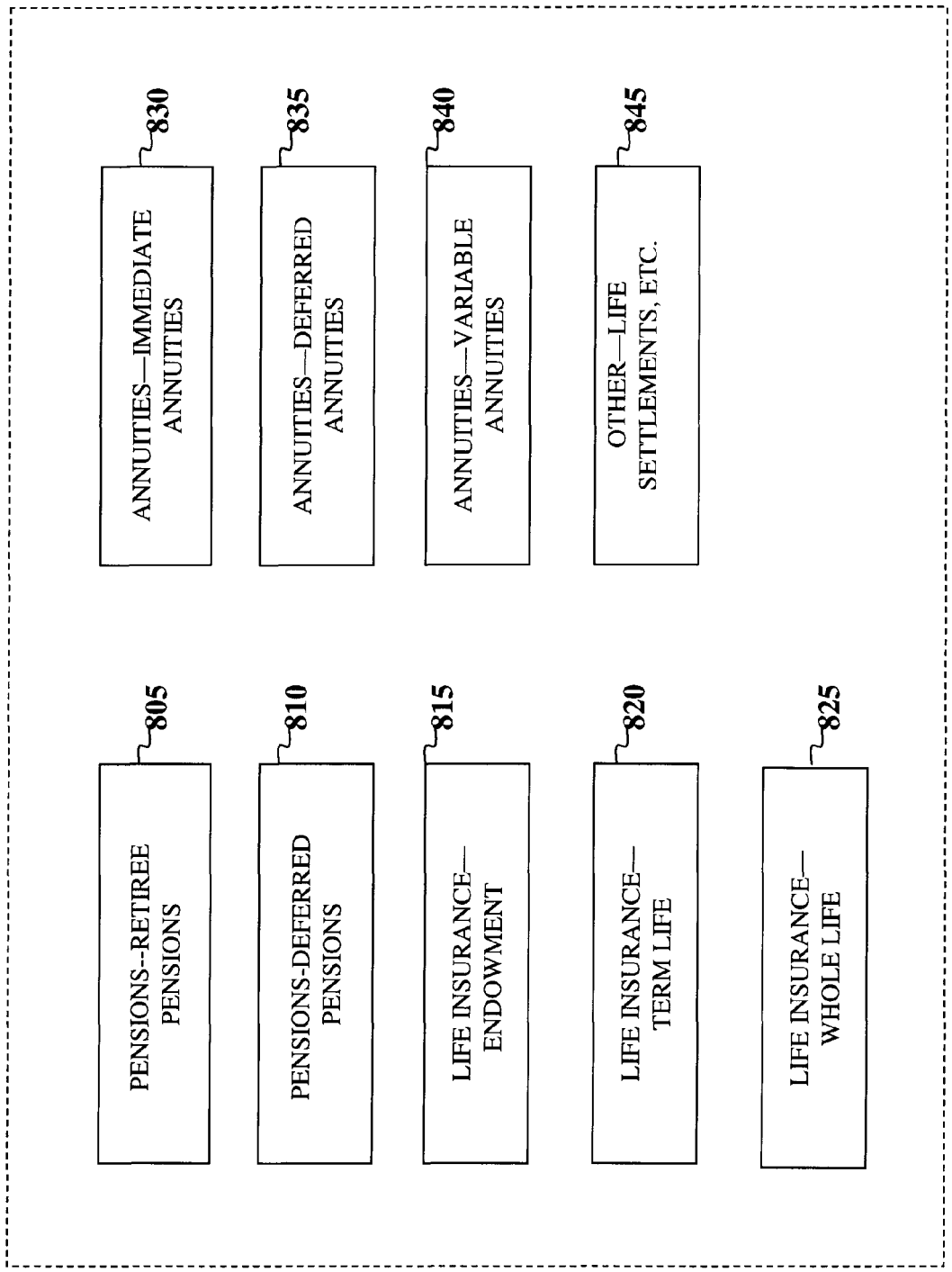
FIG. 9 is a block diagram illustrating the various mortality-sensitive portfolios that can be hedged in accordance with an embodiment of the invention.

FIG. 9 is a block diagram illustrating the various mortality-defined portfolios that can be hedged in accordance with an embodiment of the invention. The various mortality-sensitive instruments or portfolios that are amenable to hedging of mortality risk using the present invention include pensions 805-810 (retiree pensions, deferred pensions); life insurance products 815-825 (endowment, term life, whole life); annuities 830-840 (immediate, deferred, variable); and other types of mortality-sensitive instruments such as life settlements, etc.

The parties that employ these building block mortality derivatives to hedge mortality risk may include insurers, re-insurers, pension funds, governments, and other holders or issuers or sponsors of mortality-sensitive products. The purchasers or investors may include hedge funds, endowments, institutional investors, and others willing to assume mortality risk with the prospect of a return on investment.

Having described a number of different embodiments of the invention, it should be apparent to the person of ordinary skill that the invention has numerous benefits and advantages. For example, the invention provides a systemized framework for determining the mortality exposure of a portfolio and creating an effective hedge against that mortality risk/longevity risk using standardized building block mortality derivatives.

The standardized building block mortality derivatives are beneficial because a hedger can pick and choose building blocks to create an aggregation that matches the mortality exposure of the portfolio.

Not only does this allow for the creation of a portfolio-specific mortality hedge, but it can be done without requiring a special customized derivative transaction that entails significant negotiation and other transaction costs.

The standardized character of the building block mortality derivatives means that they are relatively liquid, in fact, they are readily amenable to buying and selling on a secondary market.

The invention provides particular benefits to portfolio holders having significant mortality risk components, such as insurance companies and defined benefit pension plans, particularly in view that future mortality rates are not predictable with certainty, such that the invention allows those sorts of portfolio holders to hedge mortality risk in a manner otherwise not feasible.

Because the invention allows portfolio holders to more effectively hedge the mortality exposure of their portfolios, consumers such as life insurance holders, annuity holders, and pension beneficiaries also benefit because the costs associated with price risk premiums are avoided or reduced and/or the risk of portfolio default is reduced.

Other benefits and advantages of the invention will be apparent to the person of ordinary skill in the art.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A computer-implemented method for establishing a plurality of building block mortality derivatives that can be used in multiple combinations to hedge against mortality risk or longevity risk, comprising:
   establishing a plurality of age ranges and storing the plurality of age ranges in a computer memory;
   establishing, using a programmed processor, a mortality rate related index to be applied to the building block derivatives;
   establishing, using the programmed processor, a payout based on the performance of the mortality rate related index; and
   creating the plurality of building block mortality derivatives, each building block mortality derivative hedging risk for a specified age range;
   wherein the payout for each building block mortality derivative correlates to the performance of the mortality rate related index;
   thereby providing a plurality of age-segmented mortality derivatives to hedge risk.

2. The computer-implemented method of claim 1, wherein said plurality of building block derivatives are age-stratified mortality derivatives established for specific age ranges selected from the continuum of life expectancy from infancy to a maximum age.

3. The computer-implemented method of claim 1, wherein said plurality of building block derivatives are age-stratified mortality derivatives established for a series of contiguous age ranges comprising at least a 50 year span.

4. The computer-implemented method of claim 1, wherein said plurality of building block derivatives are age-stratified mortality derivatives established for a series of contiguous age ranges from infancy to a maximum age.

5. The computer-implemented method of claim 1, wherein some of the age segments in the plurality of building block derivatives are longer than others.

6. The computer-implemented method of claim 1, wherein the age segments in the plurality of building block derivatives are 1 year segments.

7. The computer-implemented method of claim 1, wherein the age segments in the plurality of building block derivatives are 1 year segments from age 20 to age 95.

8. The computer-implemented method of claim 1, further comprising segmenting according to gender, thereby creating a plurality of building block mortality derivatives each hedging risk for a specified age range and a specified gender;
   wherein the payout for a building block mortality derivative correlates to the performance of the mortality rate related index corresponding to the age range and gender of the mortality derivative;
   thereby providing a plurality of age-segmented and gender-segmented mortality derivatives to hedge risk.

9. The computer-implemented method of claim 1, further comprising segmenting according to one or more of geography, lifestyle, health, and socioeconomic status.

10. The computer-implemented method of claim 1, wherein at least one of a price and the payout is structured based on a mortality rate model.

11. The computer-implemented method of claim 1, wherein at least one of the price and the payout is structured based on a non-deterministic, stochastic mortality model.

12. The computer-implemented method of claim 1, wherein at least one of a price and the payout is structured based on a non-deterministic, stochastic mortality model, that is a probabilistic function of gender (M/F), age (x), and time in history (t).

13. The computer-implemented method of claim 1, wherein the mortality rate related index is determined by published general population mortality rate data.

14. The computer-implemented method of claim 1, wherein the mortality rate related index is determined by published general population mortality rate data segmented by age and gender.

15. The computer-implemented method of claim 1, wherein the plurality of building block mortality derivatives comprise longevity risk mortality derivatives.

16. The computer-implemented method of claim 1, wherein the plurality of building block mortality derivatives comprise mortality risk mortality derivatives.

17. The computer-implemented method of claim 1, wherein the plurality of building block mortality derivatives comprise longevity risk mortality derivatives and mortality risk mortality derivatives.

18. The computer-implemented method of claim 1, wherein the plurality of building block mortality derivatives comprise bond-type mortality derivatives designed to hedge against longevity risk.

19. The computer-implemented method of claim 1, wherein the plurality of building block mortality derivatives comprise bond-type mortality derivatives designed to hedge against longevity risk, wherein at least one of a principal repayment and coupon payment is dependent on the mortality index.

20. The computer-implemented method of claim 1, wherein the plurality of building block mortality derivatives comprise option-type mortality derivatives designed to hedge against longevity risk and providing for a payout when the mortality-related index exceeds, meets, or falls below a threshold.

21. The computer-implemented method of claim 1, wherein the plurality of building block mortality derivatives are designed to hedge against longevity risk and include one or more of bond-type mortality derivatives, option-type mortality derivatives, swap-type mortality derivatives, and forward-type mortality derivatives.

22. The computer-implemented method of claim 1, wherein the plurality of building block mortality derivatives are designed to hedge against mortality risk and comprise one or more of bond-type mortality derivatives, option-type mortality derivatives, swap-type mortality derivatives, and forward-type mortality derivatives.

23. A computer-implemented method for establishing a plurality of building block mortality derivatives that can be used in multiple combinations to hedge on mortality risk or longevity risk, comprising:
   establishing, using a programmed computer processor, a plurality of age ranges corresponding to a mortality rate model, wherein the mortality rate model is based on the probability of mortality $q=j(g, x, t)$, where g is gender (M/F), x is age, and t is time;
   establishing, using the programmed computer processor, a mortality rate related index to be applied to the building block derivatives;
   establishing, using the programmed computer processor, a payout based on the performance of the mortality rate related index; and
   creating the plurality of building block mortality derivatives each hedging risk for a specified age range and gender;
   wherein the payout for each building block mortality derivative correlates to the performance of the mortality rate related index corresponding to the age range and gender of the mortality derivative;

thereby providing a plurality of age-segmented, gender-specific mortality derivatives to hedge risk.

24. The computer-implemented method of claim 23, wherein each building block derivative provides a hedge against the variability of the mortality performance compared to the expected performance for that age segment/gender combination.

25. The computer-implemented method of claim 23, wherein the mortality rate related index is based in part on q.

26. The computer-implemented method of claim 23, wherein the mortality rate related index is based in part on the performance of q compared to actual measured mortality rates.

27. The computer-implemented method of claim 23, further comprising:
   selecting a plurality of building block mortality derivatives that correspond to the mortality risk profile of a mortality portfolio;
   providing said selected plurality of building block mortality derivatives to the holder of the mortality portfolio;
   thereby providing a matched mortality hedge to the mortality portfolio using standardized derivative building blocks.

28. The computer-implemented method of claim 23, further comprising:
   selecting a plurality of building block mortality derivatives that correspond to the longevity risk profile of a longevity portfolio;
   providing said selected plurality of building block mortality derivatives to the holder of the longevity portfolio;
   thereby providing a matched longevity hedge to the longevity portfolio using standardized derivative building blocks.

29. The computer-implemented method of claim 23, further comprising:
   selecting a first plurality of building block mortality derivatives that correspond to the longevity risk profile of longevity instruments in a portfolio having longevity instruments and mortality instruments;
   selecting a second plurality of building block mortality derivatives that correspond to the mortality risk profile of mortality instruments in the portfolio having longevity instruments and mortality instruments;
   providing said selected plurality of building block mortality derivatives to the holder of the portfolio;
   thereby providing a matched hedge to the portfolio having longevity instruments and mortality instruments using standardized derivative building blocks.

30. The computer-implemented method of claim 23, further comprising:
   establishing a secondary market for trading of building block mortality derivatives.

31. The computer-implemented method of claim 23, further wherein the building block derivatives are established to correspond to various q segments.

32. The computer-implemented method of claim 23, wherein the mortality based index rate is based on the Mortality Index Rate$_t$=q$_t$, where $$q_t = a_m \Sigma b_x q_{m,x,t} + a_f \Sigma b_x q_{f,x,t}$$

a$_m$ and a$_f$ are Gender Weights,
b$_x$ are the Age Group Weights,
q$_{m,x,t}$ is the Mortality Rate for males in Age Group x in Measurement Period t
q$_{f,x,t}$ is the Mortality Rate for females in Age Group x in Measurement Period t.

33. The computer implemented method of claim 23, wherein the mortality rate model is further a function of least one of geography, socioeconomic status, health, and lifestyle, and further wherein the payout for a building block mortality derivative correlates to the performance of the mortality rate related index corresponding to the age range, gender, and said at least one further variable.

34. A computer-implemented system for establishing a plurality of building block mortality derivatives that can be used in multiple combinations to hedge against or speculate on mortality risk, comprising:
   a computer readable media for storing a plurality of age ranges corresponding to a mortality rate model;
   a processor programmed with code executable for determining a mortality rate related index to be applied to the building block derivatives;
   said processor programmed to establish at least one of a price and a payout based on at least one of the mortality rate model and the performance of the mortality rate related index; and
   a computer readable media for storing data of the plurality of building block mortality derivatives established in order to hedge risk for a specified age range;
   wherein the payout for each building block mortality derivative correlates to the performance of the mortality rate related index corresponding to the age range of the mortality derivative;
   thereby providing a plurality of age-segmented mortality derivatives to hedge risk.

* * * * *